July 28, 1925.
H. E. DURKEE
CUTTER GRINDER
Filed July 12, 1922 2 Sheets-Sheet 1
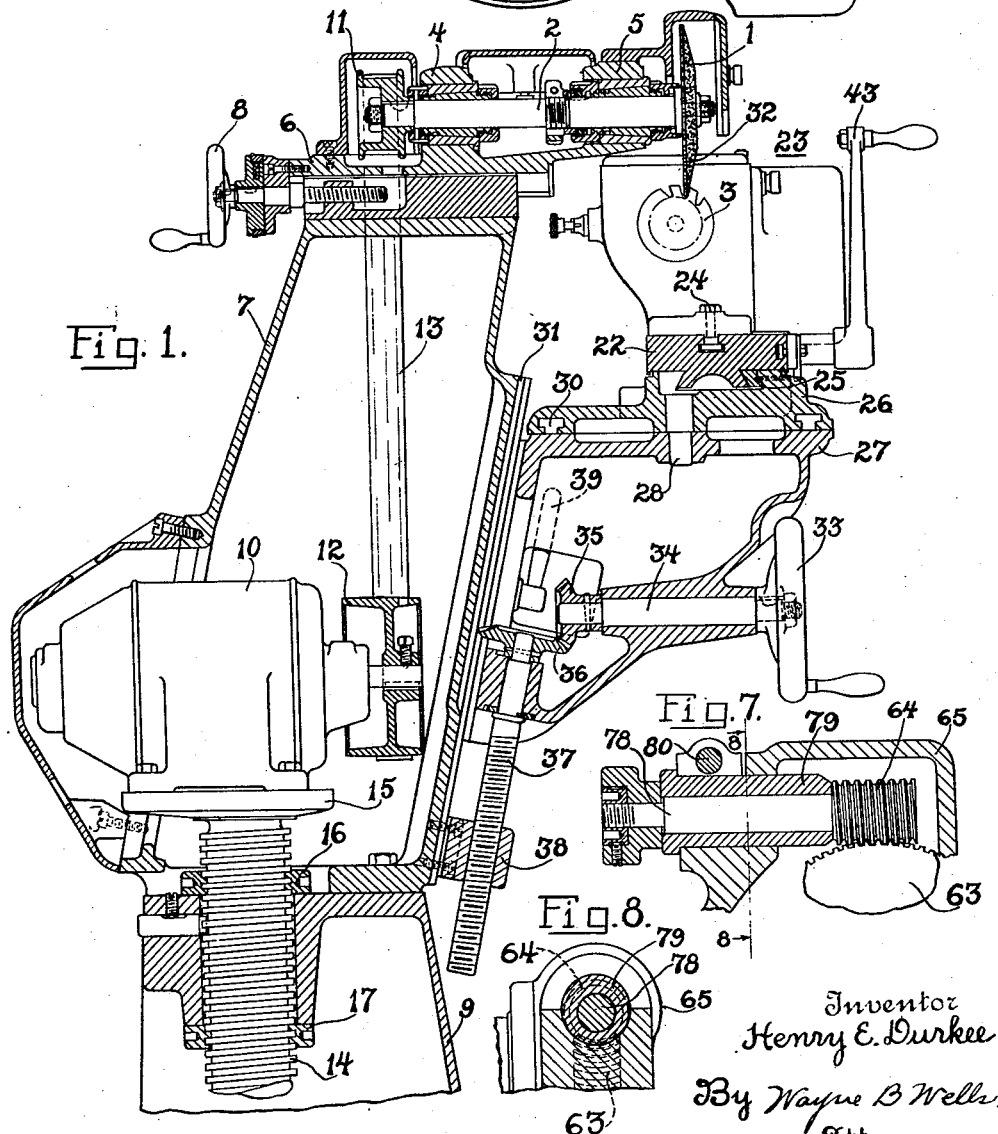

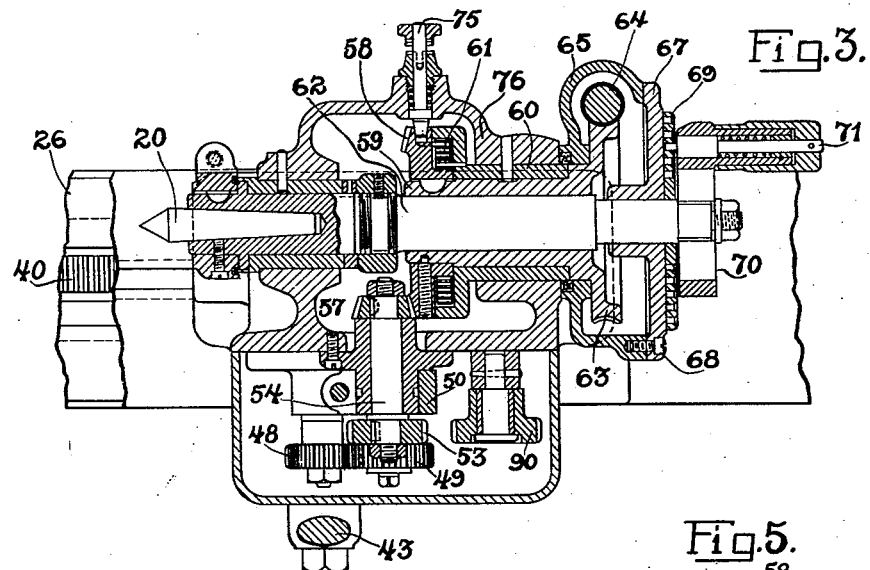
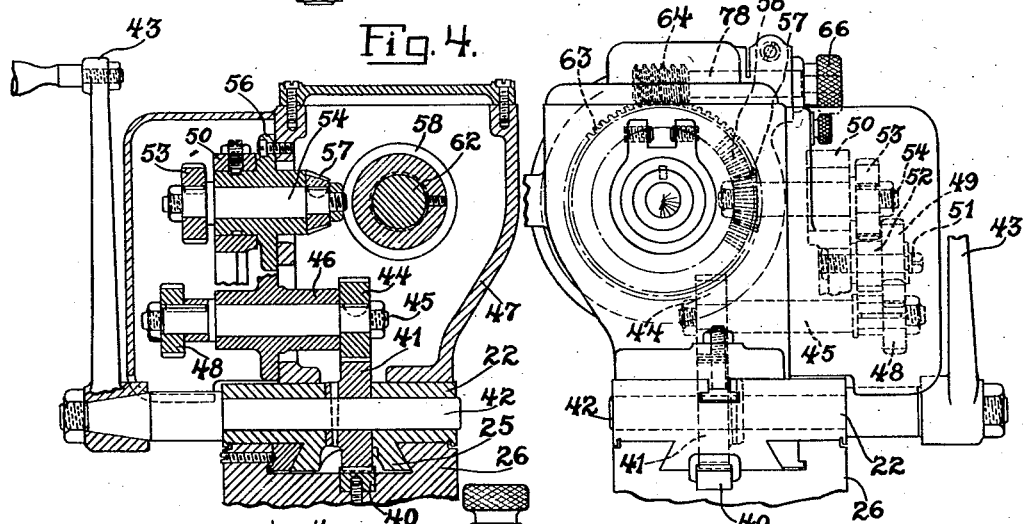
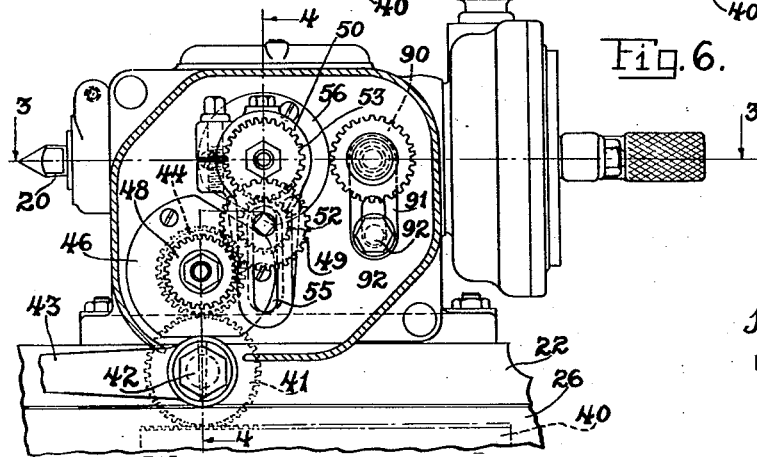

Patented July 28, 1925.

1,547,566

UNITED STATES PATENT OFFICE.

HENRY E. DURKEE, OF GLASTONBURY, CONNECTICUT, ASSIGNOR TO PRATT & WHITNEY COMPANY, OF NEW YORK, N. Y., A CORPORATION OF NEW JERSEY.

CUTTER GRINDER.

Application filed July 12, 1922. Serial No. 574,400.

*To all whom it may concern:*

Be it known that I, HENRY E. DURKEE, a citizen of the United States, residing at Glastonbury, in the county of Hartford and State of Connecticut, have invented certain new and useful Improvements in Cutter Grinders, of which the following is a specification.

My invention relates to grinding machines and particularly to machines for grinding milling cutters.

One object of my invention is to provide a grinding machine that shall have simple and improved means for effecting relative movement between a cutter and the grinding wheel while effecting rotative movement of the cutter if the cutting faces of the teeth are helicoidal in form.

Another object of my invention is to provide a grinding machine of the above indicated character that shall be provided with improved means for taking care of lost motion in the gearing system of the machine and that shall be provided with means for indexing the cutter in an efficient manner.

A further object of my invention is to provide a grinding machine of the above indicated character that shall have improved worm gearing for rotatably adjusting the cutter with respect to the grinding wheel and improved means for so adjusting the worm gearing as to take up wear.

The grinding machine disclosed in this application is closely related to the grinding machine disclosed in the patent to Friederich Müller, 1,338,320, dated April 27, 1920. The Patent No. 1,338,320 was reissued October 11, 1921, and numbered 15,206. My grinding machine differs from the grinding machine disclosed in the Patent 1,338,320 chiefly in the supporting means for the cutter and in the means for effecting a rotative movement of the cutter in accordance with the longitudinal movement thereof.

In a grinding machine constructed in accordance with my invention, the cutter, which is to be ground, is rotatably supported in any suitable manner on a slide and the side is directly mounted on a table which is preferably a turntable. The slide carries a set of gearing which engages a rack mounted on the table. The gearing serves not only to effect relative movement between the slide and the table but also to rotate the cutter in accordance with such relative movement. The set of gearing is preferably operated by a crank arm mounted on a shaft carrying a gear wheel which meshes with the teeth on the table rack. A spring, which serves to take up any lost motion in the connection between the table and the cutter is preferably included in the set of gearing. Moreover, an indexing mechanism is associated with the set of gearing and serves to effect indexing of the cutter.

A worm and a worm wheel, which are interposed in the gearing connection between the table and the cutter, are provided for effecting rotative adjustment of the cutter with respect to the grinding wheel. The worm is so mounted that it may be adjusted longitudinally with respect to the worm wheel in order to compensate for any wear between the two members. Moreover, the worm is mounted in an adjustable eccentric bearing in order to vary the distance between the axis of the worm and the axis of the worm wheel to take care of any wear between such members.

The grinding wheel is provided with a conical grinding surface which engages the cutting faces of the teeth on the cutter. The wheel and the cutter are so positioned with respect to each other that the axis of the cutter intersects and is perpendicular to an element of a conical surface of the grinding face of the wheel. The grinding machine is adapted to grind the cutting faces of cutters having either straight or inclined flutes. Moreover, the machine may be utilized not only in grinding the front cutting faces of the teeth but also the outside or peripheral faces of the teeth. For a more complete description of the operation and the construction of a grinding machine of this type, reference may be had to the patent to Müller No. 1,338,320.

In the machine disclosed in the patent to Müller, it will be noted the slide, which supports the cutter, is not directly mounted on a turntable, as in the machine disclosed in the application. In the machine disclosed in the patent two intermediate slides are provided between the cutter slide and the turntable. However, as heretofore set forth, the cutter slide in the machine disclosed in the application is directly mounted on the turntable. It should be further noted in the machine disclosed in the patent that one rack is provided solely for the purpose of effecting relative movement between the turntable and the slide directly mounted on it. Another rack, which is mounted on the slide which directly engages the slide carrying the cutter, is provided to effect rotative movement of the cutter in accordance with the longitudinal movement of the cutter slide. A third rack is provided for effecting longitudinal movement of the cutter past the grinding wheel. Thus, in the machine disclosed in the application two slides have been dispensed with and, moreover, two racks and the gear connection thereto have been dispensed with.

In the machine disclosed in the patent to Müller a weight is provided for taking up the lost motion in the gearing system. However, such weight is inoperative if it is so moved as to assume a position above the axis of the cutter. In order to overcome such difficulty, a spring has been substituted for the weight in the machine disclosed in the application.

In the accompanying drawings:

Figure 1 is a sectional elevational view of a portion of a grinding machine constructed in accordance with my invention.

Fig. 2 is a plan view of a cutter and a slide for supporting it.

Fig. 3 is a sectional view along the line 3—3 of Fig. 6.

Fig. 4 is a sectional view along the line 4—4 of Fig. 6.

Fig. 5 is an end view of the headstock for supporting the cutter.

Fig. 6 is a side elevational view of the headstock shown in Fig. 5.

Fig. 7 is a sectional view of the worm mechanism for adjusting the rotative position of a cutter.

Fig. 8 is a sectional view along the line 8—8 of Fig. 7.

Referring to the drawings, a conical grinding wheel 1 is mounted on a spindle 2 and is adapted to grind the front cutting faces of a cutter 3. The spindle 2 is provided with suitable bearings 4 and 5 on a slide 6. The slide 6 is carried by a column 7 and is adjusted on said column by means of a hand wheel 8. The column 7 is suitably secured to the main base 9 of the machine.

Preferably an electric motor 10 is located in the column 7 for rotating the grinding wheel 1. In Fig. 1 of the drawings, a pulley 11, which is mounted on the spindle 2, and a pulley 12, which is mounted on the shaft of the motor 10, are shown connected by means of a suitable belt 13. A screw member 14, which projects through the base 9 into the column 7, is provided with a table portion 15 for supporting the motor 10. Two nuts 16 and 17 are fitted to the screw member 14 on opposite sides of the top wall of the base 9. Such nuts 16 and 17 serve to raise and lower the screw member 14 for adjusting the position of the motor 10. For a more complete description of the support for the motor and the connection thereof to the grinding wheel, reference may be made to my companion application, Serial No. 557,416, filed April 29, 1922, in which such structure is described and claimed.

The cutter 3 is shown mounted on an arbor 18 which is supported by a dead center 19 and a live center 20. The dead center 19 is carried by a tailstock 21 which is adjustably mounted on a slide 22. The tailstock 21 is connected to the slide in any suitable manner and preferably by T-headed bolts. Any suitable means may be provided for adjusting the position of the dead center 19 with respect to the cutting arbor 18.

The live center 20 is carried by a controlling indexing head 23 which is mounted on the slide 22. Any suitable means may be provided for locking the head 23 in a set position on the slide 22 and, in Fig. 1 of the drawings, T-headed bolts 24 are illustrated for serving such purpose. The slide 22 is fitted to a guideway 25 in a suitable supporting member which is shown in the form of a turntable 26. The turntable 26 is mounted on a knee member 27. The turntable 26, which is pivotally connected to the knee member 27 by means of a suitable bolt 28 is secured in any adjusted position by means of suitable T-headed bolts 29 which are fitted to T-slots 30 formed in it.

The knee member 27 is movable along an inclined slide 31 which is formed on the side of the column 7. The angle of inclination of the slide 31 is the same as the angle of inclination of the grinding face 32 on the grinding wheel 1. A hand wheel 33, which is mounted on a horizontal shaft 34, is provided for moving the knee 27 along the slide 31 to raise and lower the cutter 3. The shaft 34, which is provided with a suitable bearing in the knee 27, carries a bevel gear 35 which meshes with a bevel gear 36. The bevel gear 36 is fixedly mounted on a screw shaft 37 which is rotatably supported in the knee member 27 in any suitable manner. The screw shaft 37 is fitted to a nut or threaded boss 38 which projects from the side of the column 7. The knee 27 may be locked in any adjusted position by means of a gib member which is controlled by means of a handle 39. Thus, by means of the hand wheel 33 the vertical position of the cutter 3 may be adjusted.

The turntable 26 is provided with a rack member 40 which meshes with a gear wheel 41. The gear wheel 41 is fixedly mounted on a shaft 42 which is provided with suitable bearings in the slide 22. The shaft 42 carries an operating handle 43 which serves not only to effect longitudinal movement of the slide 22 along the turntable 26 but also to effect a movement of rotation of the cutter 3 in accordance with the relative movement between the slide and the turntable. It is to be understood, however, that the cutter is only given a movement of rotation in accordance with the relative movement between the slide and turntable when a cutter having teeth provided with helicoidal cutting faces is being ground. My machine, in the same manner as the machine disclosed in the patent to Friederich Müller, is adapted to grind cutters having either straight or spiral flutes. Furthermore, my machine is adapted to grind cutter teeth having either radially or non-radially arranged cutting faces.

A gear wheel 44, which is mounted on a shaft 45, meshes with the gear wheel 41 which is mounted on the shaft 42. The shaft 45 is carried by a bearing member 46 which is secured to the frame 47 of the head 23. The shaft 45 carries a second gear wheel 48 which meshes with a gear wheel 49. The gear wheel 49 is rotatably supported on an arm 50 by means of a bolt 51. The bolt 51 carries a second gear wheel 52 which meshes with a gear wheel 53. The arm 50 is mounted on a shaft 54 which also carries the gear wheel 53. The bolt 51 is adjustable along a slot 55 which is formed in the arm 50. The shaft 54 is carried by a suitable bearing member 56 which is detachably secured to the main frame 47 of the head. A bevel gear wheel 57, which is carried near the inner end of shaft 54, meshes with a bevel gear wheel 58.

The bevel gear wheel 58 is keyed to a sleeve 59 which is rotatably mounted in a second sleeve 60. A spring member 61 is provided for exerting a constant tension on the bevel gear wheel to take up any lost motion. One end of the coil spring 61 is connected to the bevel gear wheel 58 while the other end thereof is connected to the sleeve member 60. A spindle 62, which carries the live center 20 is adapted to rotate within the sleeve member 59.

One end 63 of the sleeve member 59 is provided with a worm wheel having teeth which mesh with a worm 64. The worm wheel and the worm are located in a casing 65. The casing 65 is rotatably carried on the sleeve 59, as shown in Fig. 3 of the drawings. The worm 64 is formed on a shaft 78 which is provided with suitable bearings in the casing 65. A knurled handle 66 is formed on one end of the shaft 78. Thus, it is apparent by operating the handle 66, the rotative position of the casing 65 relative to the position of the worm wheel formed on the sleeve 59 may be varied. An end plate 67, which is rotatably mounted on the spindle 62, is secured to the casing 65 in any suitable manner as by means of screws 68. An indexing dial plate 69 is suitably secured to the end plate 67. A crank arm 70 is keyed to the spindle 62 and carries a pin 71 which is fitted to the holes formed in the indexing dial plate 69. The rotation of the bevel gear wheel 58 transmits movement through the sleeve 59, worm wheel 63, worm 64, casing 65, indexing mechanism and the spindle 62 to the cutter 3. Thus, it is apparent the operation of the handle 43 not only effects relative movement between the slide 22 and the turntable 26 but also effects a movement of rotation of the cutter 3.

An idler gear wheel 90 is provided for connecting the gear wheel 52 to the gear wheel 53 when it is desired to reverse the direction of rotation of the cutter. The direction of rotation of the cutter is reversed when the flutes on the cutter are inclined in an opposite direction. The gear wheel 90 is rotatably mounted on an arm 91 which is mounted on a bolt 92. The bolt 92 is secured, in any suitable manner, to the frame of the headstock. Thus, in order to reverse the direction of rotation of the cutter, it is only necessary to disconnect the gear wheel 52 from the gear wheel 53 and interpose the idler gear 90 between such gear wheels.

The spring member 61 maintains a constant tension on the gearing connection between the rack on the turntable and the cutter, and thus serves to take up any lost motion. A pin 75 which projects through a casing 76 is adapted to fit in holes formed on the periphery of the bevel gear wheel 58. The pin 75 serves to prevent any movement of rotation of the spindle 62 when cutters having straight flutes are being ground. When straight fluted cutters are being ground, it is necessary to discontinue some of the gears in the system between the rack 40 on the turntable and the spindle 62 in order to prevent rotation of the spindle and the cutter by means of the handle 43. The pin 75 not only holds the cutter and the spindle in the set position but also prevents rotation of the bevel gear wheel 58 by means of the spring member 61. The worm and gear connection between the casing 65, which carries the indexing dial plate, and the sleeve 59 serves as a means to adjust the rotative position of the milling cutter which is to be ground. Thus, operation of the worm 64 by means of handle 66 serves to angularly adjust the milling cutter with respect to the gearing system.

In the machine disclosed in this application, it will be noted one set of gearing is provided not only for connecting the turntable to the slide for effecting relative movement between the slide and turntable but also for effecting a connection to the milling cutter in order to effect rotation of the milling cutter in accordance with the relative movement between the slide and turntable. However, it will be understood that the milling cutter is given a movement of rotation in accordance with the relative movement between the slide and turntable only when cutters having inclined flutes are being ground. The spring member 61, which maintains a constant tension on the gearing system, is effective in all rotative positions of the cutter and is not merely effective in certain positions as in the case of a counterweight.

The shaft 78, which carries the worm 64, is provided with a bearing in an eccentric sleeve 79. The sleeve 79 is supported in the casing 65 and is locked in any set position by means of a screw 80. The sleeve 79 being eccentric in form, that is, the opening which carries the shaft 78 having a different center from the periphery of the sleeve, supplies a means for adjusting the axis of the shaft 78 relative to the worm wheel formed on the sleeve 59. Thus, adjustment of the sleeve 79 serves to adjust the teeth on the worm 64 relative to the teeth on the worm wheel for taking up any wear that may occur. The longitudinal position of the worm member 64 may be adjusted by means of the nut which is secured to the end of the shaft 78, to take up any wear between the worm and the bearing.

Modifications in the machine and in the arrangement and location of parts may be made within the spirit and scope of my invention and such modifications are intended to be covered by the appended claims.

What I claim is:

1. In a cutter grinding machine, the combination with a grinding wheel, a slide having a spindle rotatably mounted for supporting the cutter to be operated on, a supporting member for said slide, and a rack mounted on said supporting member, of gearing mounted on said slide and operatively connected to said rack and spindle, means rotatably mounted on said slide for operating said gearing to effect relative movement between the slide and the supporting member and for giving the spindle and its cutter a movement of rotation, means for locking the cutter against rotation, and means for moving a part of the gearing to inoperative position, whereby said slide may be moved without rotation of said spindle.

2. In a cutter grinding machine, the combination with a grinding wheel, a slide having a spindle rotatably mounted for supporting the cutter to be operated on, a supporting member for said slide, and a rack mounted on said supporting member, of gearing mounted on said slide and normally operatively connected to said rack and to said spindle, means rotatably mounted on said slide for operating said gearing to effect relative movement between the slide and the supporting member, and whereby the cutter and cutter spindle may be simultaneously rotated, a spring interposed in said gearing for taking up lost motion between the members of said gearing, means for locking the cutter against rotation when grinding straight fluted cutters, and means for disconnecting the spindle rotating members of said gearing, whereby said slide may be moved without rotation of said spindle.

In testimony whereof, I hereto affix my signature.

HENRY E. DURKEE.